(12) United States Patent
Yoo et al.

(10) Patent No.: US 11,969,754 B2
(45) Date of Patent: Apr. 30, 2024

(54) PREPARATION METHOD FOR COMPOSITE MATERIAL

(71) Applicant: LG CHEM, LTD., Seoul (KR)

(72) Inventors: Dong Woo Yoo, Daejeon (KR); Jong Min Shin, Daejeon (KR)

(73) Assignee: LG Chem, LTD., Seoul (KR)

( * ) Notice: Subject to any disclaimer, the term of this patent is extended or adjusted under 35 U.S.C. 154(b) by 560 days.

(21) Appl. No.: 16/646,632

(22) PCT Filed: Sep. 17, 2018

(86) PCT No.: PCT/KR2018/010896
§ 371 (c)(1),
(2) Date: Mar. 12, 2020

(87) PCT Pub. No.: WO2019/054815
PCT Pub. Date: Mar. 21, 2019

(65) Prior Publication Data
US 2020/0290085 A1 Sep. 17, 2020

(30) Foreign Application Priority Data
Sep. 15, 2017 (KR) .................. 10-2017-0118864

(51) Int. Cl.
*B05D 3/06* (2006.01)
*C09D 4/00* (2006.01)
*C09D 135/02* (2006.01)

(52) U.S. Cl.
CPC .............. *B05D 3/067* (2013.01); *C09D 4/00* (2013.01); *C09D 135/02* (2013.01)

(58) Field of Classification Search
CPC ........ B05D 3/067; C09D 4/00; C09D 135/02; B22F 2007/042; B22F 2988/10; B22F 2999/00; B22F 7/04; B32B 2305/022; B32B 2310/08; B32B 37/24; B32B 5/18; B32B 27/065; B32B 38/0008; B32B 38/10; B32B 2266/045
See application file for complete search history.

(56) References Cited

U.S. PATENT DOCUMENTS 3,839,080 A    10/1974  Jarema et al.
7,632,565 B1   12/2009  Imam et al.
(Continued)

FOREIGN PATENT DOCUMENTS

CN    102513074 A    6/2012
CN    205900325 U    1/2017
(Continued)

OTHER PUBLICATIONS

Machine English translation of JP 2010-056179 (Year: 2010).*
(Continued)

*Primary Examiner* — Jessica M Roswell
(74) *Attorney, Agent, or Firm* — SALIWANCHIK, LLOYD & EISENSCHENK

(57) ABSTRACT

The present application provides a method for preparing a composite material. The present application provides a method for preparing a composite material comprising a metal foam and a polymer component, wherein the polymer component is formed in an asymmetrical structure on both sides of the metal foam, and a composite material prepared in such a manner.

14 Claims, 2 Drawing Sheets

(56) References Cited

U.S. PATENT DOCUMENTS

| | | | |
|---|---|---|---|
| 8,114,511 B2 | 2/2012 | Akita | |
| 9,956,588 B2 | 5/2018 | Shin et al. | |
| 2007/0099020 A1 | 5/2007 | Karl et al. | |
| 2016/0146556 A1* | 5/2016 | Chauhan | B22F 1/0553 428/312.8 |
| 2016/0312074 A1* | 10/2016 | Choi | C09J 7/22 |

FOREIGN PATENT DOCUMENTS

| | | |
|---|---|---|
| EP | 0692546 | 1/1996 |
| JP | H01225925 A | 9/1989 |
| JP | H02291673 A | 12/1990 |
| JP | H10157007 | 6/1998 |
| JP | 2001527656 A | 12/2001 |
| JP | 2010056179 A | 3/2010 |
| JP | 2010192233 A | 9/2010 |
| JP | 5189300 B2 | 2/2013 |
| JP | 5189300 | 4/2013 |
| KR | 950001785 B1 | 3/1995 |
| KR | 960003829 | 2/1996 |
| KR | 1020070079891 | 8/2007 |
| KR | 100969194 | 7/2010 |
| KR | 20140074642 | 6/2014 |

OTHER PUBLICATIONS

Extended European Search Report corresponding to European Patent Application No. 18855578.3 (10 pages) (dated Oct. 21, 2020).
English translation of International Search Report corresponding to International Patent Application No. PCT/ KR2018/010896 (2 pages) (dated Dec. 19, 2018).

* cited by examiner

PREPARATION METHOD FOR COMPOSITE MATERIAL

CROSS REFERENCE TO RELATED APPLICATIONS

This application is a 35 U.S.C. § 371 national stage application of PCT International Application No. PCT/KR2018/010896, filed Sep. 17, 2018, which claims priority from Korean Patent Application No. 10-2017-0118864, filed Sep. 15, 2017, the contents of which are incorporated herein in their entireties by reference. The above-referenced PCT International Application was published in the Korean language as International Publication No. WO 2019/054815 A1 on Mar. 21, 2019.

TECHNICAL FIELD

The present application relates to a method for preparing a composite material.

BACKGROUND ART

Metal foams can be applied to various fields including lightweight structures, transportation machines, building materials or energy absorbing devices, and the like by having various and useful properties such as lightweight properties, energy absorbing properties, heat insulating properties, refractoriness or environment-friendliness. In addition, metal foams not only have a high specific surface area, but also can further improve the flow of fluids, such as liquids and gases, or electrons, and thus can also be usefully used by being applied in a substrate for a heat exchanger, a catalyst, a sensor, an actuator, a secondary battery, a gas diffusion layer (GDL) or a microfluidic flow controller, and the like.

A composite material in which the metal foam and a resin component are combined with each other can be manufactured for the purpose of expanding application fields of the metal foam or reinforcing physical properties, and the like.

DISCLOSURE

Technical Problem

The present application is intended to provide a method for preparing a composite material and a composite material prepared by the method.

Technical Solution

The present application relates to a method for preparing a composite material and a composite material thereof. The term composite material may mean a material comprising a metal foam and a polymer component.

In this specification, the term metal foam or metal skeleton means a porous structure comprising a metal as a main component. Here, the metal as a main component means that the ratio of the metal is 55 weight % or more, 60 weight % or more, 65 weight % or more, 70 weight % or more, 75 weight % or more, 80 weight % or more, 85 weight % or more, 90 weight % or more, or 95 weight % or more based on the total weight of the metal foam or the metal skeleton. The upper limit of the ratio of the metal contained as the main component is not particularly limited, which may be, for example, 100 weight %, 99 weight % or 98 weight % or so.

In this specification, the term porous property may mean a case where porosity is at least 30% or more, 40% or more, 50% or more, 60% or more, 70% or more, 75% or more, or 80% or more. The upper limit of the porosity is not particularly limited, and may be, for example, less than about 100%, about 99% or less, or about 98% or less, 95% or less, 90% or less, 85% or less, 80% or less, or 75% or less or so. The porosity can be calculated in a known manner by calculating the density of the metal foam or the like.

The metal foam included in the composite material of the present application may be in a film shape. The composite material of the present application may comprise a metal foam in the film form as above and a polymer component present on at least one surface of the opposite surfaces of the metal foam. That is, in the composite material, the polymer component may also exist on both opposite surfaces of the metal foam, and the polymer component may also exist only on one surface. Here, the both opposite surfaces may mean surfaces facing each other such as upper and lower surfaces or both sides of a metal foam in the form of a film. Hereinafter, for convenience, among the surfaces facing each other, a surface having a relatively large amount of polymer component may be referred to as a first surface and a surface where the polymer component is not present or is less present over the first surface as the opposite surface may be referred to as a second surface.

In the composite material, the metal foam may have porosity in a range of about 40% to 99%. In one example, the porosity of the metal foam or the size of the pores, and the like can be controlled in consideration of a desired asymmetric structure in forming the composite material in a manner to be described below. For example, in forming an asymmetric structure by a method to be described below, when the porosity of the metal foam is small or the size of the pores is small, the degree that the light irradiated from one surface reaches the other surface is reduced and on the contrary, when it is large, the degree of reacting the other surface is increased, whereby a curing degree of a photo-curable composition on the opposite surface can be controlled. In another example, the porosity may be 50% or more, 60% or more, 70% or more, 75% or more, or 80% or more, or may be 95% or less, 90% or less, 85% or less, or 80% or less or so.

The metal foam may be in the form of a film. In this case, the thickness of the film can be adjusted in consideration of the shape of the desired asymmetric structure or the like in manufacturing the composite material according to a manner to be described below. That is, as the thickness of the film form becomes thicker, the degree that light irradiated from one surface reaches the other surface becomes smaller in forming an asymmetric structure in a manner to be described below, and on the contrary, the thinner it is, the degree of reaching the other surface becomes larger, whereby the curing degree of the photo-curable composition on the opposite surface can be controlled. The thickness of the film may be, for example, in a range of about 5 μm to 5 cm. In another example, the thickness may be 4 cm or less, 3 cm or less, 2 cm or less or 1 cm or less or may also be 6 μm or more, 7 μm or more, 8 μm or more, 9 μm or more, or 10 μm or more or so.

The skeleton of the metal foam may be composed of various kinds of metals or metal alloys, which may comprise, for example, one or more metals or metal alloys selected from the group consisting of iron, cobalt, nickel, copper, phosphorus, molybdenum, zinc, manganese, chromium, indium, tin, silver, platinum, gold, aluminum, stainless steel and magnesium, or may consist of the metal or metal alloy.

Such metal foams are variously known, and methods for preparing metal foams are also variously known. In the present application, such known metal foams and metal foams prepared by the known methods can be applied.

As a method for preparing a metal foam, a method of sintering a pore-forming agent such as a salt and a composite material of a metal, a method of coating a metal on a support such as a polymer foam and sintering it in this state or a slurry method, and the like is known. Furthermore, the metal foam can also be prepared by a method disclosed in Korean Patent Application No. 2017-0086014, 2017-0040971, 2017-0040972, 2016-0162154, 2016-0162153 or 2016-0162152, and the like, which is a prior application of the present applicant.

The metal foam may also be prepared by the induction heating method from the methods described in the prior applications, where the metal foam may comprise at least a conductive magnetic metal. In this case, the metal foam may comprise 30 weight % or more, 35 weight % or more, 40 weight % or more, 45 weight % or more, or 50 weight % or more of the conductive magnetic metal on the basis of weight. In another example, the ratio of the conductive magnetic metal in the metal foam may be about 55 weight % or more, 60 weight % or more, 65 weight % or more, 70 weight % or more, 75 weight % or more, 80 weight % or more, 85 weight % or more, or 90 weight % or more. The upper limit of the ratio of the conductive magnetic metal is not particularly limited, and may be, for example, less than about 100 weight % or 95 weight % or less.

In the present application, the term conductive magnetic metal is a metal having predetermined relative magnetic permeability and conductivity, which may mean a metal capable of generating heat to such an extent that the metal can be sintered by the induction heating method.

In one example, as the conductive metal, a metal having relative magnetic permeability of 90 or more may be used. The relative magnetic permeability ($\mu_r$) is a ratio ($\mu/\mu_0$) of the magnetic permeability ($\mu$) of the relevant material to the magnetic permeability ($\mu_0$) in the vacuum. In another example, the relative magnetic permeability may be 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. The higher the relative magnetic permeability is, the higher the heat is generated at the time of application of the electromagnetic field for induction heating which is described below, whereby the upper limit is not particularly limited. In one example, the upper limit of the relative magnetic permeability may be, for example, about 300,000 or less.

The conductive magnetic metal may have conductivity at 20° C. of about 8 MS/m or more, 9 MS/m or more, 10 MS/m or more, 11 MS/m or more, 12 MS/m or more, 13 MS/m or more, or 14.5 MS/m or more. The upper limit of the conductivity is not particularly limited, and for example, the conductivity may be about 30 MS/m or less, 25 MS/m or less, or 20 MS/m or less.

A specific example of such a conductive magnetic metal includes nickel, iron or cobalt, and the like, but is not limited thereto.

The polymer component formed on both opposite surfaces of the metal foam in the composite material has an asymmetric structure. Here, the asymmetric structure means that the ratios of the polymer component present on both surfaces are different.

In one example, the ratio (B/A) of the area ratio (A) of the polymer component present on the first surface of the metal foam and the area ratio (B) of the polymer component present on the second surface may be in a range of 0 to 0.99. When the ratio (B/A) is 0, it means a case where there is no polymer component on the second surface. Also, here, the area ratio is a percentage of the area covered with the polymer component relative to the area of the surface of the relevant metal foam.

In another example, the ratio (B/A) may be about 0.95 or less, 0.90 or less, 0.85 or less, 0.80 or less, 0.75 or less, 0.70 or less, 0.65 or less, 0.60 or less, 0.55 or less, 0.50 or less, 0.45 or 0.40 or less, but this can be adjusted considering the intended use.

Here, the area ratio (A) of the polymer component present on the first surface is not particularly limited, but may be, for example, about 90% or more, about 91% or more, 92% or more, 93% or more, 94% or more, 95% or more, 96% or more, 97% or more, 98% or more, 99% or more, or may be 100% or so. The area ratio (B) of the polymer component on the second surface may be 0%, that is, the polymer component is not present on the second surface, or may exceed 0%. Also, in one example, the area ratio (B) may be about 99% or less, about 95% or less, about 90% or less, about 85% or less, about 80% or less, about 75% or less, about 70% or less, about 65% or less, about 60% or less, about 55% or less, about 50% or less, about 45% or less, or about 40% or less or so.

In the above example, when the area ratio (B) of the polymer component on the second surface is 0%, that is, when the polymer component is not formed on the second surface, the ratio (P/T) of the length (P) from the first surface to the portion where the polymer component is present in the interior of the metal foam in the direction toward the second surface to the length (T) from the first surface to the second surface may be in a range of 0 to 1. That is, in this case, the polymer component in the interior of the metal foam may exist in the entire range from the first surface to the second surface (P/T=1), or may not exist in the interior of the metal foam (P/T=0). In another example, the ratio (P/T) may be more than 0, 0.1 or more, 0.2 or more, 0.3 or more, 0.4 or more, or 0.45 or more, or may be 0.95 or less, 0.9 or less, 0.85 or less, 0.8 or less, 0.75 or less, 0.7 or less, 0.65 or less, 0.6 or less, or 0.55 or less.

On the other hand, here, the length (P) from the first surface to the portion where the polymer component is present in the interior of the metal foam as measured in the direction toward the second surface may be the length to the deepest point or the length to the shortest point, where the polymer component is present, or an average value of the lengths that the polymeric component is present, as measured from the first surface.

FIG. 1 is a schematic diagram of the composite material, which shows a case where a metal foam (101) is present in the middle, one surface of the metal foam (101) is covered entirely by a polymer component (102) and a polymer component (103) is partially present on the other surface.

Here, the polymer component may be a cured product of a curable composition. The term curable composition means a substance capable of being cured by irradiation of light to form a polymer.

In this specification, the irradiation of light may also include irradiation of particle beams, such as alpha-particle beams, proton beams, neutron beams and electron beams, as well as microwaves, infrared (IR), ultraviolet (UV), X-rays and gamma rays, and the like.

Such a photo-curable composition can be exemplified by an acrylic photo-curable composition, an epoxy photo-curable composition, an isocyanate photo-curable composition, a urethane photo-curable composition, or a silicone photo-curable composition, and the like. Each of the compositions is a composition that can be cured to form an acrylic polymer component, an epoxy polymer component, an isocyanate polymer component, a urethane polymer component or a silicone polymer component, and such compositions are variously known in the polymer composition industry, whereby in the present application, an appropriate component can be selected from such known components and used, and if necessary, a complex polymer can also be formed by using two or more components of the foregoing.

Generally, such a composition comprises a polymer component, oligomer component and/or monomer component having a functional group that can be cured by light irradiation, and comprises an initiator capable of initiating curing reaction by irradiation of light, for example, a radical initiator, a cationic initiator, and the like. Here, the functional group that can be cured by light irradiation can be exemplified by a functional group containing a radically polymerizable double bond such as an acryloyl group or a methacryloyl group, or a cationic polymerizable functional group such as a glycidyl group, an alicyclic epoxy group or an oxetanyl group, and the like, but is not limited thereto.

In the structure of the composite material, the thickness of the polymer component present on the first surface of the metal foam may be in a range of about 1 nm to 1 cm. However, the thickness may be appropriately changed depending on the purpose. In another example, the thickness may be about 100 nm to 100 μm or so.

The thickness (P2T) of the polymer component may be in a range of 0 to 1 cm. However, the thickness may also be appropriately changed depending on the purpose.

Also, in the structure of the composite material, the polymer component present on the second surface may be present in the form of a pillar.

Here, the thickness of the polymer component is a thickness measured with the surface of the relevant metal foam as the starting point.

However, the weight ratio, the thickness ratio or the thickness, or the shape of the polymer component as mentioned above can be controlled according to applications of the composite material, which is not particularly limited.

The composite material of the present application can be used as a heat insulating material, a heat dissipating material, a soundproof material, a lightweight material, a structural material or an electrode material, and the like.

The composite material having such a type can be prepared through a step of irradiating only one surface of both surfaces of the metal foam that the photo-curable composition is formed on at least one surface of both surfaces, that is, the first and second surfaces with light. The photo-curable composition may be present on only one surface of the first and second surfaces, or may also be present on both surfaces.

If the light is irradiated in such a manner, the photo-curable composition on the surface of the light-irradiated metal foam is cured by the irradiated light, but at least a part of the photo-curable composition on the opposite side surface is light-blocked by the metal foam, so that the curing reaction does not proceed or proceeds weakly. Therefore, when the uncured composition is removed after the light irradiation process, the above-described asymmetric structure can be realized. Here, the uncured composition includes the case where the curing reaction proceeds weakly so that it can be removed in a removing process to be described below, as well as the case where the curing reaction does not proceed at all.

Therefore, according such a manner, when the degree or direction of light irradiation, the thickness of the photo-curable composition and/or the thickness of the metal foam, or the porosity or pore size of the metal foam, and the size of the pores is controlled, the shape of the asymmetric structure can be adjusted variously.

In one example, the process may form the photo-curable composition on at least one of the first and second surfaces of the metal foam to a thickness in a range of about 1 nm to 2 cm, where the photo-curable composition may be formed in the form of a layer, but is not limited thereto.

In the process, the method of forming the photo-curable composition on both surfaces of the metal foam is not particularly limited. For example, a method of immersing the metal foam in the photo-curable composition to be impregnated, or a method of coating the photo-curable composition on the metal foam may be applied.

Also, the form of light irradiation is not particularly limited, and an appropriate type of light may be irradiated depending on the curing conditions of the applied photo-curable composition. For example, in the case of an ultraviolet irradiation process which is a general light irradiation process, ultraviolet rays can be irradiated at an illumination intensity in a range of about 800 to 2000 $W/cm^2$ and a light quantity of about 10 to 10,000 $mJ/cm^2$, but this condition is exemplary.

The preparation method of the present application may further perform a step of removing the uncured photo-curable composition after the light irradiation.

By this process, the above-described asymmetric structure can be formed. The step of removing the uncured photo-curable composition may be referred to as developing. Such a developing process may be performed in a known manner, and for example, the developing process may be performed using a processing agent or the like known to be capable of removing the uncured composition, where as the processing agent, developers such as ethanol, salt water, N-methylpyrrolidone, methylene chloride, chloroform, toluene, ethylene glycol or propylene glycol monomethyl ether acetate, and the like are known. The developing process can be performed through appropriate treatment using such a developer, and for example, the developing process can be performed by applying the developer in a spray developing manner at a pressure of about 2 bar or more and a temperature range of 20° C. to 50° C.

The present application also relates to a composite material, for example, a composite material formed in such a manner.

As described above, such a composite material comprises a metal foam in the form of a film and a polymer component existing on both opposite surfaces of the metal foam, where the polymer component on both surfaces may have the asymmetric structure as described above.

For the details of the composite material, for example, the kind, thickness, thickness ratio or weight ratio of the metal foam and the polymer component, the shape of the polymer component, and the like, the above-described contents can be equally applied.

Advantageous Effects

The present application provides a method for preparing a composite material comprising a metal foam and a polymer component, wherein the polymer component is formed in an asymmetrical structure on both surfaces of the metal foam, and a composite material prepared in such a manner.

MODE FOR INVENTION

Hereinafter, the present application will be described in detail by way of examples and comparative examples, but the scope of the present application is not limited to the following examples.

Example 1

A metal foam was a copper metal foam, where the copper metal foam being in the form of a film having a thickness of about 40 μm or so and having porosity of approximately 75% or so was used. As a photo-curable composition, a material obtained by mixing DPHA (dipentaerythritol hexxaacrylate) as an ultraviolet curing monomer and TPO (Darocure) as a radical initiator was used. The photo-curable composition was coated on the surfaces of the copper metal foam to a thickness of about 70 μm or so. Subsequently, ultraviolet rays (wavelength: 320 nm) were irradiated only on the upper surface of the metal foam at a light quantity of about 3 J/cm$^2$ or so. After the ultraviolet irradiation, the uncured composition was removed by a developing process using a developer (ethanol) to prepare a composite material.

Figure 1:
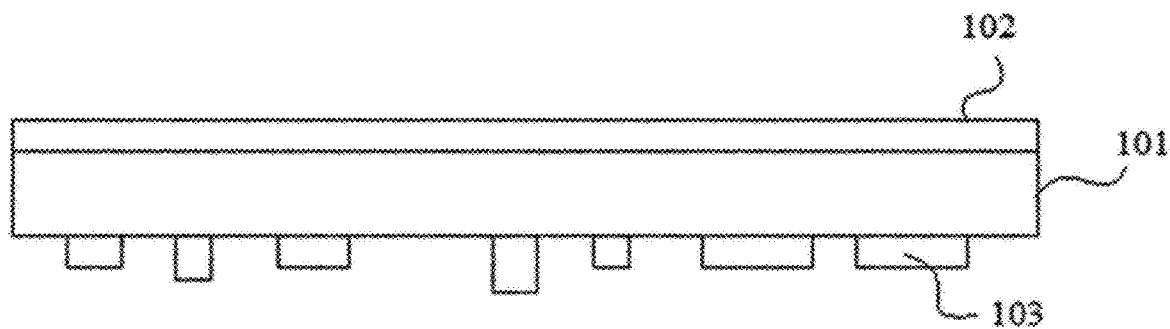
FIG. 1 is a schematic side view of a composite material of the present application.
Figure 2:
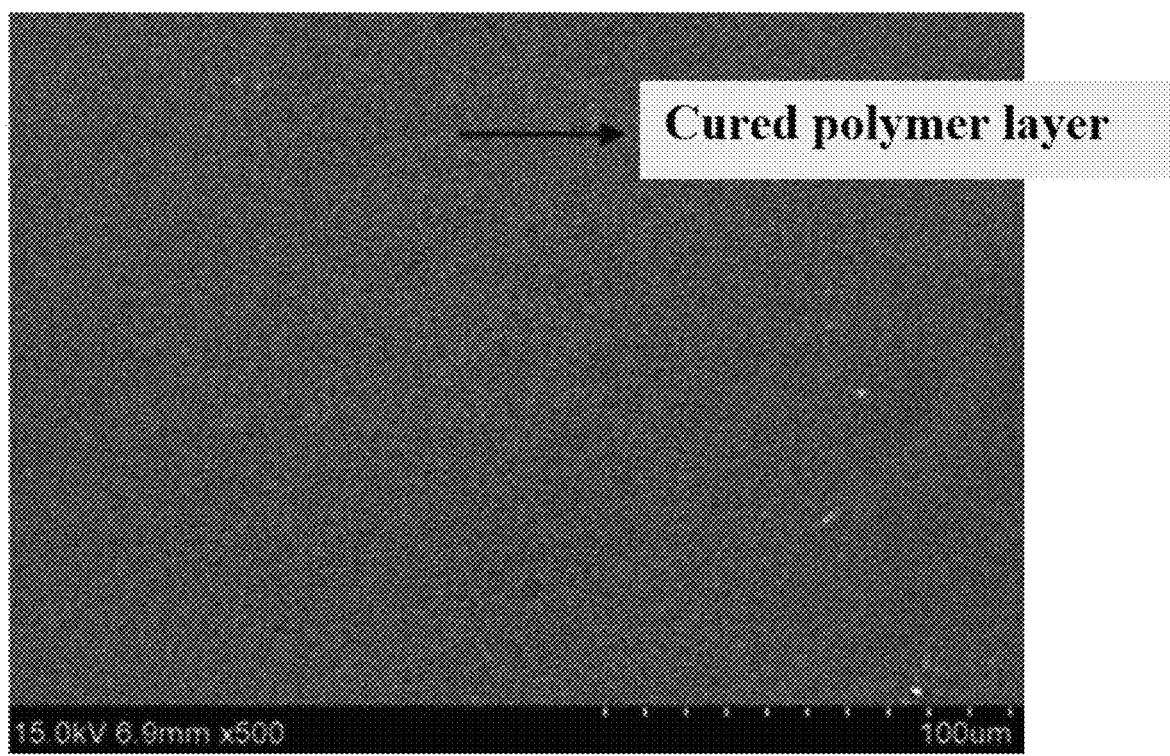
FIG. 2 is a top view of the composite material formed in Example 1.

FIG. 2 was the surface irradiated with ultraviolet rays as a top view of the composite material formed by the above process, where almost the entire area of the metal foam surface was covered with the polymer component as in the drawing. At this time, the thickness of the polymer component layer was about 50 to 60 μm or so.

Figure 3:
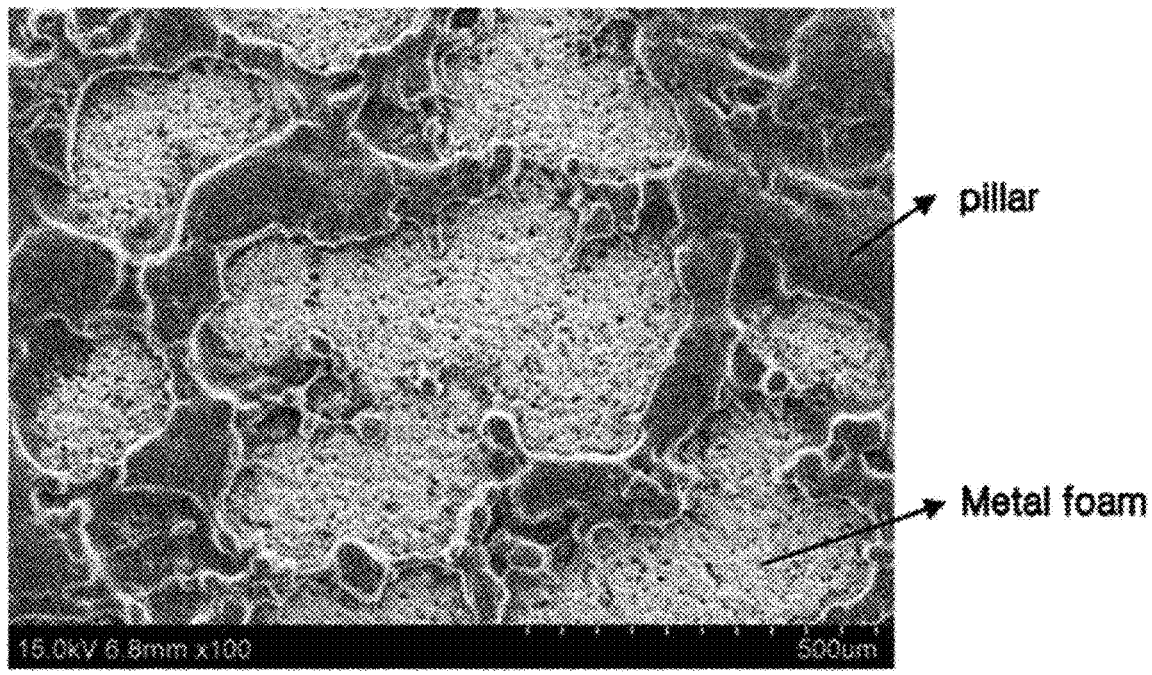
FIG. 3 is a bottom view of the composite material formed in Example 1.
Figure 4:
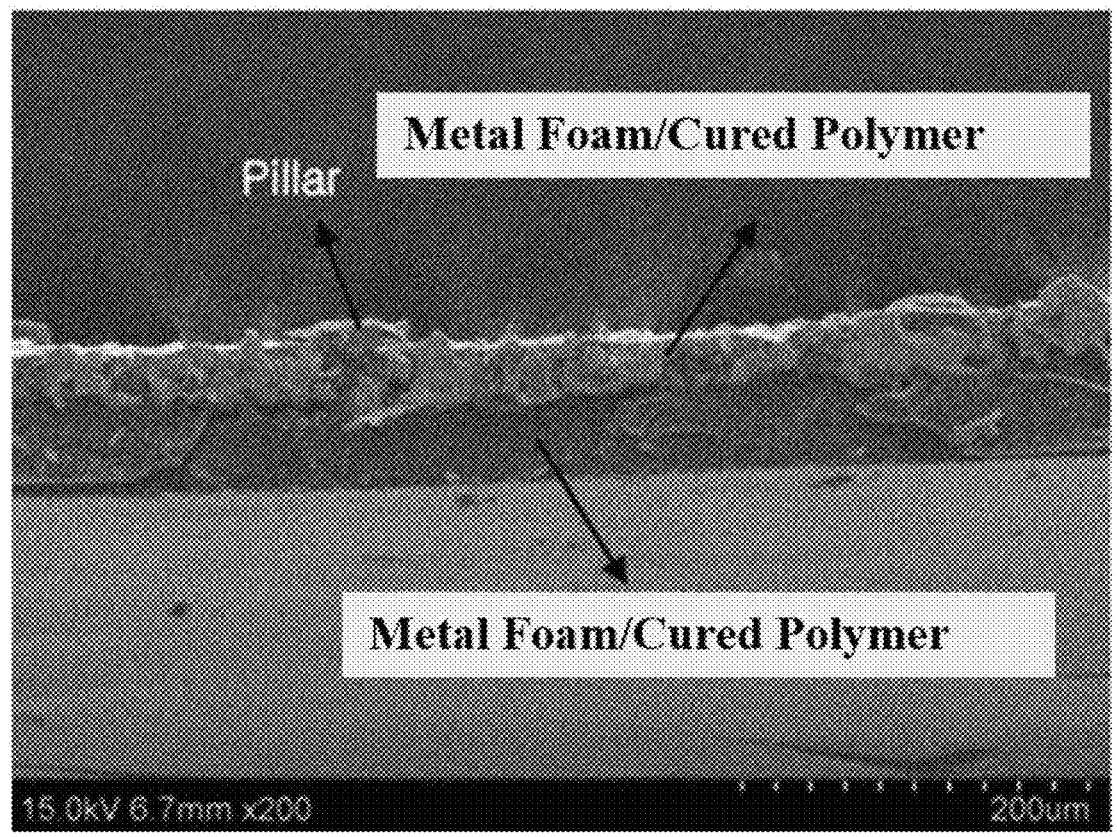
FIG. 4 is a cross section view of the composite material formed in Example 1.

FIG. 3 is a bottom view of the composite material formed by the above process, which is a view of the surface opposite to the surface irradiated with ultraviolet rays. As in the drawing, the polymer component (pillar) covered only a part of the surface of the metal foam, and the metal foam was exposed on the surface. At this time, the thickness of the polymer component (pillar) was about 10 μm or so, and the polymer component (pillar) covered an area of about 36% in the metal foam surface. FIG. 4 is a cross section view of the composite material formed by the above process.

Example 2

A composite material was prepared in the same manner as in Example 1, except that the light quantity was changed to about 100 mJ/cm$^2$ upon ultraviolet irradiation. In this case, due to the lowered light quantity of the ultraviolet irradiation, the composite material was formed, in which the pillar of the polymer component was not formed on the surface opposite to the surface irradiated with ultraviolet rays, and inside the metal foam, the polymer also existed to a depth of about 20 μm from the side irradiated with ultraviolet rays in the thickness direction. In this case, the thickness of the polymer component on the surface irradiated with ultraviolet rays was about 50 μm or so, and in the case of the opposite side, the area ratio was 0%.

What is claimed is:

1. A method for preparing a composite material that comprises a metal foam having a first surface and a second surface opposite the first surface, the method comprising:
   irradiating with light only the first surface of the metal foam on which a photo-curable composition is present, thereby forming a polymer component on the first surface; and
   removing uncured photo-curable composition from the second surface of the metal foam after irradiation,
   wherein the metal foam is in a film shape, wherein the polymer component has an area ratio (A) on the first surface and the polymer component has an area ratio (B) on the second surface and a ratio (B/A) is in a range of 0 to 0.90,
   wherein the area ratio (A) of the polymer component present on the first surface is 90% or more.

2. The method according to claim 1, wherein the metal foam has a skeleton comprising one or more metals or metal alloys selected from the group consisting of iron, cobalt, nickel, copper, phosphorus, molybdenum, zinc, manganese, chromium, indium, tin, silver, platinum, gold, aluminum, stainless steel and magnesium.

3. The method according to claim 1, wherein the metal foam has a thickness in a range of 5 μm to 5 cm.

4. The method according to claim 1, wherein the metal foam has porosity in a range of 40% to 99%.

5. The method according to claim 1, wherein the photo-curable composition is an acrylic photo-curable composition, an epoxy photo-curable composition, an isocyanate photo-curable composition, a urethane photo-curable composition or a silicone photo-curable composition.

6. The method according to claim 1, wherein the polymer component on the first surface has a thickness in a range of 1 nm to 1 cm.

7. The method according to claim 1, wherein the ratio (B/A) is greater than 0 and less than or equal to 0.70, and the polymer component is in a pillar form on the second surface.

8. The method according to claim 1, wherein a length (P) extends, in a direction to the second surface, from the first surface to a point where the polymer component is present in the interior of the metal foam, and a length (T) extends from the first surface to the second surface, and wherein a ratio (P/T) is in a range of 0 to 1.

9. The method according to claim 8, wherein the ratio (P/T) is greater than 0 and is less than 0.95.

10. The method according to claim 1, wherein the photo-curable composition is formed on the first surface of the metal foam to a thickness of 1 nm to 2 cm.

11. A composite material comprising:
a metal foam in a film shape having opposing first and second surfaces, and a polymer component present on the first surface and the second surface,
wherein the polymer component has an area ratio (A) on the first surface and the polymer component has an area ratio (B) on the second surface, and wherein a ratio (B/A) is greater than 0 to less than or equal to 0.90, and wherein the area ratio (A) of the polymer component present on the first surface is 90% or more.

12. The composite material according to claim 11, wherein the ratio (B/A) is greater than 0 and less than or equal to 0.70.

13. The composite material according to claim 11, wherein the ratio (B/A) is greater than 0 and less than or equal to 0.50.

14. The method of claim 1, wherein the ratio (B/A) is greater than 0 and less than or equal to 0.50.

* * * * *